United States Patent
Prodhomme et al.

(10) Patent No.: US 9,996,238 B2
(45) Date of Patent: Jun. 12, 2018

(54) DEVICE AND METHOD FOR GENERATING AT LEAST ONE COMPUTER FILE FOR PRODUCING A GRAPHIC INTERFACE OF AN ELECTRONIC EQUIPMENT, AND RELATED COMPUTER PROGRAM PRODUCT

(71) Applicant: THALES, Courbevoie (FR)

(72) Inventors: Alexandre Prodhomme, Pessac (FR); Jean-Charles Badoche, Pessac (FR); Jean-Louis Heleine, Pessac (FR)

(73) Assignee: Thales, Courbevoie (FR)

( * ) Notice: Subject to any disclaimer, the term of this patent is extended or adjusted under 35 U.S.C. 154(b) by 341 days.

(21) Appl. No.: 14/721,929

(22) Filed: May 26, 2015

(65) Prior Publication Data

US 2015/0346986 A1 Dec. 3, 2015

(30) Foreign Application Priority Data

May 27, 2014 (FR) .................... 14 01209

(51) Int. Cl.
*G06F 9/44* (2006.01)
*G06F 9/45* (2006.01)
(Continued)

(52) U.S. Cl.
CPC ...... *G06F 3/04847* (2013.01); *G06F 3/04842* (2013.01); *G06F 8/10* (2013.01);
(Continued)

(58) Field of Classification Search
CPC .......... G06F 11/3608; G06F 8/30; G06F 8/74; G06F 8/10; G06F 8/35; G06F 17/30;
(Continued)

(56) References Cited

U.S. PATENT DOCUMENTS 6,681,383 B1    1/2004  Pastor et al.
7,278,130 B2 *  10/2007 Iborra ...................... G06F 8/30
                                                        717/101
(Continued)

OTHER PUBLICATIONS

Mark Jason Hadley, Empirical Evaluation of the Effectiveness and Reliability of Software Testing Adequacy Criteria and Reference Test Systems, Sep. 2013, [Retrieved on Dec. 19, 2017]. Retrieved from the internet: <URL: http://etheses.whiterose.ac.uk/5861/1/PhD%20Thesis_135.pdf> 179 Pages (1-179).*

(Continued)

*Primary Examiner* — Anibal Rivera
(74) *Attorney, Agent, or Firm* — Knobbe, Martens, Olson & Bear, LLP (57) ABSTRACT

A device for generating at least one computer file for producing a graphic interface of an electronic equipment, and related computer program product are disclosed. In one aspect, the generating device includes a creation module for creating a formalized description of the graphic interface in the form of software requirements, each requirement being associated with a graphic object of the graphic interface and being created from a list of resources, and a generation module for generating, from the formalized description, the computer file from among a source code and descriptive documents of the computer code, the source code being designed to be compiled in executable code to produce the part of the graphic interface. The creation module includes a filtering capability configured to select, in particular as a function of the corresponding graphic object, only some resources from among the list of resources.

12 Claims, 3 Drawing Sheets

(51) Int. Cl.
*G06F 11/00* (2006.01)
*G06F 11/28* (2006.01)
*G06F 3/0484* (2013.01)
*G06F 11/36* (2006.01)

(52) U.S. Cl.
CPC .................. *G06F 8/35* (2013.01); *G06F 8/38* (2013.01); *G06F 11/3672* (2013.01); *G06F 8/74* (2013.01); *G06F 11/3608* (2013.01)

(58) Field of Classification Search
CPC .... G06F 8/71; G06F 11/3672; G06F 11/3604; G06F 11/3684
See application file for complete search history.

(56) References Cited

U.S. PATENT DOCUMENTS

| | | | | |
|---|---|---|---|---|
| 8,423,879 B2* | 4/2013 | Bhatt | .................. | G06F 11/3684 703/13 |
| 8,954,920 B2* | 2/2015 | Biglari | ...................... | G06F 8/30 717/100 |
| 8,984,343 B2* | 3/2015 | Schloegel | ........... | G06F 11/3608 714/37 |
| 8,984,488 B2* | 3/2015 | Bhatt | .................. | G06F 11/3604 717/126 |
| 9,027,001 B2* | 5/2015 | Easwaran | ................. | G06F 8/74 717/126 |
| 9,098,619 B2* | 8/2015 | Bhatt | .................. | G06F 11/3608 |
| 2002/0100014 A1* | 7/2002 | Iborra | ...................... | G06F 8/30 717/104 |
| 2004/0169591 A1* | 9/2004 | Erkkinen | ............ | G06F 11/3672 340/945 |
| 2005/0114841 A1* | 5/2005 | Moskowitz | ............... | G06F 8/71 717/126 |
| 2007/0129855 A1* | 6/2007 | Coulmeau | ............ | G08G 5/0039 701/3 |
| 2009/0070635 A1* | 3/2009 | Depraz | .............. | G05B 23/0256 714/47.1 |
| 2009/0138097 A1* | 5/2009 | Rinaldi | ................... | H04L 41/00 700/17 |
| 2011/0225568 A1* | 9/2011 | Rajan | .................. | G06F 11/3608 717/126 |
| 2012/0272209 A1* | 10/2012 | Biglari | ...................... | G06F 8/30 717/105 |
| 2013/0019224 A1* | 1/2013 | Madl | ......................... | G06F 8/10 717/104 |
| 2014/0019943 A1* | 1/2014 | Easwaran | ................. | G06F 8/74 717/126 |
| 2015/0302827 A1* | 10/2015 | Danielsson | ............ | G01C 23/00 345/581 |

OTHER PUBLICATIONS

Jesper Honig Spring, Reflexes: Programming Abstractions for Highly Responsive Computing in Java, 2008, [Retrieved on Dec. 19, 2017]. Retrieved from the internet: <URL: https://infoscience.epfl.ch/record/126356/files/EPFL_TH4228.pdf> 181 Pages (1-155).*

Yannick Moy AdaCore, Testing or Formal Verification: DO-178C Alternatives and Industrial Experience, 2013 IEEE, [Retrieved on Dec. 19, 2017]. Retrieved from the internet: <URL: http://ieeexplore.ieee.org/stamp/stamp.jsp?arnumber=6471965> 8 Pages (50-57).*

Dubois et al., A Model for Requirements Traceability in a Heterogeneous Model-Based Design Process: Application to Automotive Embedded Systems, 2010 15th IEEE International Conference on Engineering of Complex Computer Systems (ICECCS), Piscataway, NJ, USA, Mar. 22, 2010, pp. 233-242.

Winkler et al., A survey of traceability in requirements engineering and model-driven development, Software & Systems Modeling, Springer, Berlin, DE, vol. 9, No. 4, Dec. 22, 2009, pp. 529-565.

Moy et al, Testing or Formal Verification: DO-178C Alternatives and Industrial Experience, IEEE Software Journal, May-Jun. 2013 (May 1, 2013), pp. 50-57.

French Search Report & Written Opinion dated Mar. 4, 2015 for French Patent Application No. 1401209 filed May 27, 2014.

* cited by examiner

DEVICE AND METHOD FOR GENERATING AT LEAST ONE COMPUTER FILE FOR PRODUCING A GRAPHIC INTERFACE OF AN ELECTRONIC EQUIPMENT, AND RELATED COMPUTER PROGRAM PRODUCT

CROSS-REFERENCE TO RELATED APPLICATIONS

This application claims benefit under 35 U.S.C. § 119 of French Application No. 14 01209, filed May 27, 2014, which is herein incorporated by reference in its entirety.

BACKGROUND

Field

The described technology relates to an electronic device for generating at least one computer file from among the computer code and at least one descriptive document of the computer code, to produce at least part of a graphic interface of an electronic equipment.

Description of the Related Art

The generating device comprises a creation capability for creating a formalized description of the graphic interface in the form of software requirements, each requirement being associated with a graphic object of the graphic interface and being created from a list of resources. The generating device comprises a generation capability for generating, from the created formalized description, at least one computer file among a source code and at least one descriptive document of the source code, the source code being designed to be compiled in an executable code for the production of the at least part of the graphic interface of the electronic equipment, each descriptive document containing information relative to the software requirements.

The described technology also relates to a method for generating at least one such computer file.

The described technology also relates to a non-transitory computer readable medium including a computer program including software instructions which, when implemented by a computer, implement such a generating method.

The described technology applies to the field of man-machine interfaces for onboard electronic equipment, in particular graphic interfaces of those pieces of onboard equipment, such as aeronautic equipment, railroad equipment, automobile equipment and aerospace equipment.

A generating device and method of the aforementioned type are known from document U.S. Pat. No. 6,681,383 B1.

This document describes a tool for the automatic production of a software program comprising a capability for creating a formal specification, a capability for validating the generated formal specification and a capability for automatic conversion of the validated formal specification into source code.

The formal specification is created in the form of system requirements that are entered using class diagrams, and the generating device comprises a graphic interface for requirement entry, the graphic interface being an object-oriented interface.

This document relates to the field of client-server applications.

The graphic interface is generated in a single step, and the requirements are created from a frozen list of resources.

Such a generating device is suitable for three-phase software development for the descending part of the V-shaped cycle, i.e., the specification, design and production of the code.

Such a generating device validates the completeness and accuracy of the created requirements once those requirements have been converted into the formal specification(s). The designer therefore enjoys considerable freedom of creation during the phase for creating the requirements.

Such a generating device also makes it possible to generate documentation for informational purposes and describing the created source code.

However, such a generating device is not very suitable for generating a graphic interface source code in the field of onboard electronic equipment.

SUMMARY OF THE CERTAIN INVENTIVE ASPECTS

An objective of certain inventive aspects is therefore to facilitate and improve the production of at least part of the graphic interface of the onboard equipment, in particular the generation of the source code for the associated documentation, while helping the designer to create software requirements, then by automatically generating the source code from the created software requirements.

To that end, one inventive aspect is an electronic generating device of the aforementioned type, in which the creation module includes filtering capability suitable for selecting, in particular as a function of the corresponding graphic object, only some resources from among the list of resources.

Owing to the generating device according to certain aspects of the described technology, the designer is assisted in the production of the part of the graphic interface, while being guided as early as possible, in particular as of the entry of the software requirements, the device according to the described technology offering the designer, via the filtering capability, only a limited list of resources for the creation of the software requirements. This makes it possible to ensure as early as possible, as of the creation of the software requirements, that the constraints associated with the graphic interface of the onboard equipment are indeed verified.

According to other advantageous aspects of the described technology, the generating device comprises one or more of the following features, considered alone or according to all technically possible combinations:

- the device further comprises a compilation module for compiling the generated source code into an executable code, the executable code being able to be executed by the electronic equipment to produce the at least one part of the graphic interface;
- at least one software requirement includes a field to be completed; and the filtering capability is suitable for selecting only certain resources from among the list of resources further as a function of the type of field;
- the creation module further includes an acquisition capability, only in the form of a chain of alphanumeric characters, for data of the field;
- each software requirement is chosen from the group consisting of: an initial display requirement, a display refresh requirement, a requirement of an interaction associated with the graphic object and a processing requirement for an event;

the filtering capability is suitable for selecting only some resources from among the list of resources further as a function of the type of the corresponding software requirements;

the filtering capability is further suitable for selecting a syntax of the requirement from among several possible syntaxes, in particular as a function of the corresponding graphic object;

the filtering capability is suitable for selecting the syntax of the requirement further as a function of the type of the corresponding software requirements;

each descriptive document generated by the generation module complies with the requirements of standard RTCA DO-178C, each descriptive document desirably being chosen from the group consisting of: a specification document, a design document and a traceability document for requirements of the specification and/or design documents.

Another aspect is a method for generating at least one computer file from among a computer code and a descriptive document of the computer code, in order to produce at least part of a graphic interface for an electronic equipment, the method being implemented by a computer and comprising the following steps:

creating a formalized description of the graphic interface in the form of software requirements, each requirement being associated with a graphic object of the graphic interface and being created from a list of resources, generating, from the created formalized description, at least one computer file from among a source code and a descriptive document of the source code, the source code being designed to be compiled into executable code in order to produce at least part of the graphic interface of the electronic equipment, the descriptive document containing information relative to the software requirements, wherein the creation step further includes filtering the resources in order to select, in particular as a function of the corresponding graphic object, only some resources from among the list of resources.

According to another advantageous aspect of the described technology, the generating method comprises the following feature: the method further comprises, after the generating step, a step for compiling the generated source code in an executable code, the executable code being able to be executed by the electronic equipment in order to produce the at least part of the graphic interface.

The described technology also relates to a non-transitory computer readable medium including a computer program including software instructions which, when implemented by a computer, implement a generating method as defined above.

BRIEF DESCRIPTION OF THE DRAWINGS

These features and advantages of the described technology will appear upon reading the following description, provided solely as a non-limiting example, and done in reference to the appended drawings, in which.

DETAILED DESCRIPTION OF CERTAIN INVENTIVE EMBODIMENTS

Figure 1:
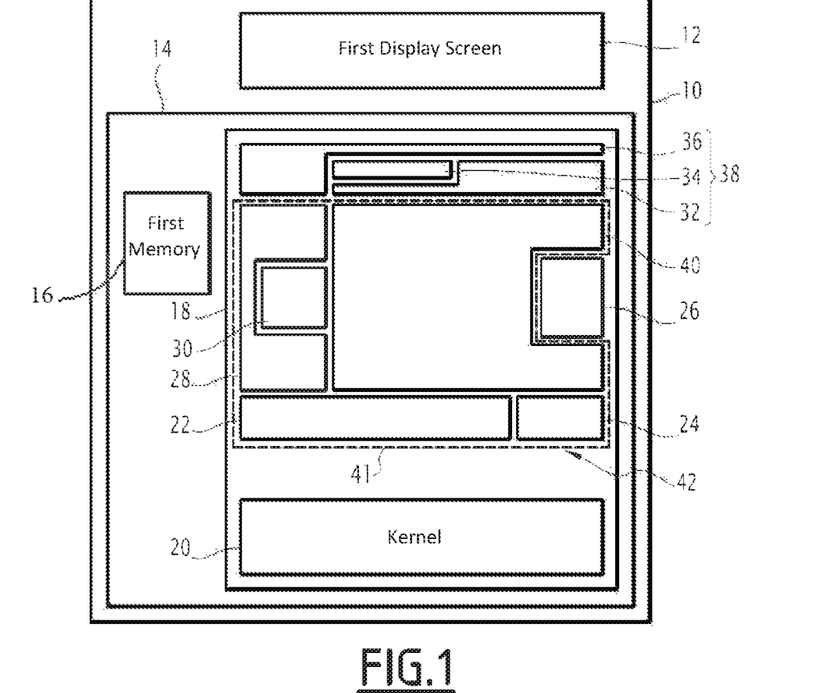
FIG. 1 is a diagrammatic illustration of an onboard electronic equipment including a first information display screen and a first information processing unit, formed by a first processor and a first memory associated with the first processor, the first memory being able to store a kernel and a graphic interface, in order to display information on the first screen.

In FIG. 1, an electronic equipment 10 comprises a first display screen 12 and a first information processing unit 14 for example formed by a first processor 14 and a first memory 16 associated with the first processor 14.

The electronic equipment 10 is for example an onboard equipment, such as aeronautic equipment, railroad equipment, automobile equipment or aerospace equipment.

The first memory 16 is able to store a kernel 20, also called system core, rendering a list of software services and manipulating core data, a first layer 22 for standardizing interfaces with the kernel 20 (core wrapper), making it possible to use software services provided by the kernel 20 and to consult/modify the core data, and a second layer 24 for standardizing message management interfaces (message manager). The messages include system messages and user messages, the management of the system messages being done by the core 20, and that of the user messages being done by the second standardization layer 24. Message management in particular refers to the publication and/or erasure of those messages.

The first memory 16 is also able to store a first library 26 of data format, also called data format library, a graphic interface sequencer 28 (component processing) and a browser 30.

The first memory 16 is also able to store a second library 32 for defining widgets, also called widget library, a third library 34 for coding/decoding information, also called coding library, and a protocol manager 36. The second and third libraries 32, 34 and the protocol manager 36 form a layer 38 for managing the display of data on the screen 12.

The first memory 16 is lastly able to store a specific layer 40.

The first standardization layer 22, the second standardization layer 24, the first library 26, the sequencer 28, the browser 30, the second library 32, the third library 34, the protocol manager 36 and the specific layer 40 are each a software brick.

The software bricks 22, 24, 28, 30 and 40 form a man-machine interface (MMI) instance 41, also called MMI instance 41.

The set of software bricks 22 to 40 forms a software component 42 for managing a graphic interface 50 of the equipment, the software component 42 being able to be stored in the first memory 16, as shown in FIG. 1. The graphic interface 50 comprises at least one higher-level element 52, also called format, each format 52 including at least one page 54, and each page 54 including at least one graphic object 56, as will be described in more detail below in light of FIG. 2.

The electronic equipment 10 then for example includes N screen(s) 12 able to display a graphic interface 50 and the memory 18 includes M man-machine interface instance(s) 41 each managing a format 52, N and M being integers greater than or equal to 1, for example greater than or equal to 2. The values of the numbers N and M are not correlated, N and M having different or equal values.

The first standardization layer 22 makes it possible to provide standardized management of the interfaces with the kernel 20 and then provides a generic manner of manipulating the lists and interactive objects.

The second standardization layer 24 makes it possible to provide standardized processing for the graphic interfaces of the messages, in particular to manage system alert lists generated by the kernel 20 or user message lists.

The first library 26 contains information relative to data formats entered or to be displayed through the graphic interface 50. The information contained in the first library 26 is varied and depends on formats. The information relative to each format for example includes a type of format, an authorized value range for the data of the format, a format size. For the formatting of an angle, it is for example necessary to specify the unit of the input value and the output value of the formatting, in order to be converted if necessary. To format numerical data of the core into a string of characters to be displayed, it is for example necessary to specify a maximum number of characters to be kept after the decimal point, or whether it is necessary to fill in 0s to reach a maximum size of the string.

The sequencer 28 is suitable for receiving, filtering and sequencing the events from the protocol manager 36 or the kernel 20, the events for example being an action by the user on the graphic interface 50, a connection/disconnection. The sequencer 28 is able to address the specific layer 40, which in turn will lean on the first library 26, the browser 30, respectively, the first and second standardization layers 22 and 24, the second library 32, to format the data to manipulate, change pages, respectively, recover data or trigger processing in the kernel 20, recover/publish/delete messages, modify the properties of graphic objects. After this request, the sequencer 28 is able to order the protocol manager 36 to send frames to the screen 12.

The browser 30 is suitable for managing a page history 54 (FIG. 2) displayed on the screen 12, and also for managing display services, such as refreshing or closing pages 54.

Figure 2:
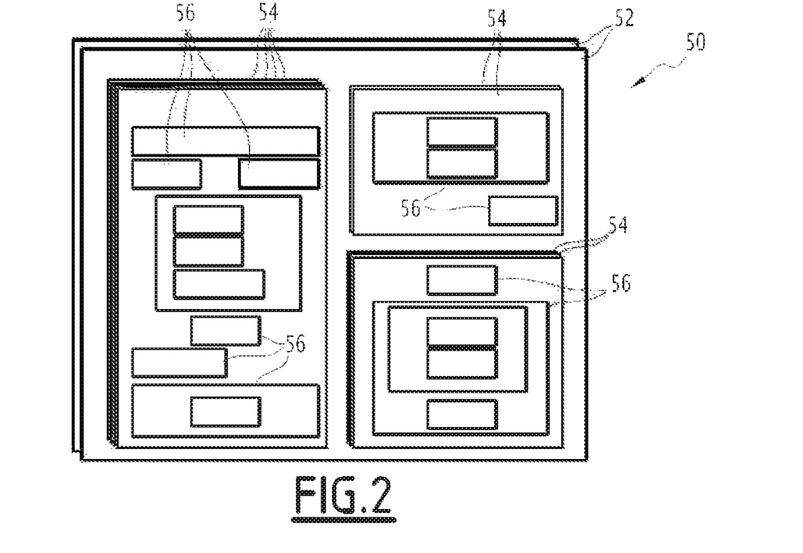
FIG. 2 is a diagrammatic illustration of a static definition of the graphic interface.

The second library 32 is suitable for providing a standardized definition of the display of the graphic interface 50 of FIG. 2, in particular widgets, for example according to standard Aeronautical Radio, Incorporated (ARINC) 661, or according to standard ARINC 739. The second library 32 in particular includes information relative to the type and properties of the graphic objects.

The third library 34 provides encoding or decoding services for information contained in the buffer memories, and is then suitable for encoding information intended for the screen 12 and/or decoding information received from the screen 12.

The protocol manager 36 is suitable for managing the reception, sending, respectively, of frames coming from the screen(s) 12, intended for the screen(s) 12, respectively. The protocol manager 36 is in particular suitable for redirecting the communications coming from a screen 12 toward the sequencer 28 of the corresponding MMI instance 41, and conversely returning the frames delivered by the specific layer 40 of an MMI instance 21 to the corresponding screen 12.

The protocol manager 36 comprises a table, not shown, containing a respective identifier for each of the screens 12 and for each of the MMI instances 41, the table providing the link between the screen(s) 12 and the corresponding MMI instance(s) 41.

The protocol manager 36 is for example in accordance with part 4.0 entitled "Communication Protocol" of standard ARINC 661.

The specific layer 40 is specific to the graphic interface 50, and is different from one graphic interface to the next. The specific layer 40 can be generated by a device 60 (FIG. 3) for generating at least one computer file from among computer code and at least one descriptive document of the computer code. In other words, the specific layer 40 corresponds to an executable code compiled from a source code, the source code being able to be generated by the generating device 60. The executable code is also able to be compiled by the generating device 60 and from the generated source code.

The specific layer 40 contains a list of pages 54, a dynamic definition of each of the pages 54, the dynamic definition specifying the dynamic behavior of the pages 54 as a function of services or events handled by the second library 32, the browser 30, the first and second standardization layers 22, 24 and the first library 26.

The specific layer 40 also contains a context of the graphic interface 50, i.e., the data shared between the pages 54, a list of user messages and a list of data formats.

This software architecture of the software component 42 for managing the graphic interface, the component 42 including the software bricks 22 to 40, then allows a standardized management of the kernel 20.

This software architecture also allows a standardized management of the screen 12 and/or display standards via: the management, by the manager 36, of the reception protocol, sending protocol, respectively, of the frames coming from, intended for, respectively, the screen 12, the decoding, encoding library 34, respectively, for the frames received, to be sent, respectively, and standardized services for manipulating the properties of graphic objects 56 by the second library 32.

This software architecture also allows the management of browsing via the browser 30, the management of data formatting to be displayed or entered by the operator via the first library 26 and the standardized management of messages via the second standardization layer 24.

FIG. 2 illustrates a static definition of the graphic interface 50. As previously described, the graphic interface 50 comprises one or more formats 52, each format 52 in turn including one or more pages 54, and each page 54 includes one or more graphic objects 56.

The format 52 is similar to a copy grouping together a set of information and interactions consistent in terms of displayed functionalities and graphic output, a first format 52 for example being dedicated to the cartographical display and a second format 52 for example being dedicated to the textual display.

Each page 54 includes a consistent subset of graphic objects 56 in terms of functionalities, the graphic object 56 being the lowest-level element and allowing interactions with a user and the display of information intended for the user.

Each graphic object 56 has properties and interactions, and the controlling of those properties makes it possible to offer the users that information and the interactions.

The graphic object 56 is for example a label, and it has properties that include a size, position, visibility and associated text. No interaction is associated with the graphic object 56 when it is a label.

The graphic object 56 is for example a button, and it has properties in that case that include a size, position, facility, associated text and status relative to the possibility of activating or not activating the button forming the graphic object 56. An interaction associated with the graphic object 56, when the latter is a button, is a selection of the graphic object 56.

The graphic object 56 is for example an entry field, and it has properties that include a size, position, visibility, default text and status relative to the possibility of activating or not activating the entry field forming the graphic object 56. Interactions associated with the graphic object 56, when the latter is an entry field, are a publishing input, entering a character, validating an entered string and canceling publishing.

The graphic object 56 is for example a checkbox, and the properties associated with checkbox are a size, position, visibility, state relative to the possibility of activating or not activating the checkbox forming the graphic object 56, and a selection state. The selection state has two possible values, i.e., an active value corresponding to a selected checkbox and an inactive value corresponding to a deselected checkbox. Interactions associated with the graphic object 56, when the latter is a checkbox, are a selection of the checkbox when the selection state is in the inactive state, and a deselection of the checkbox when the selection state is the active state.

Figure 3:
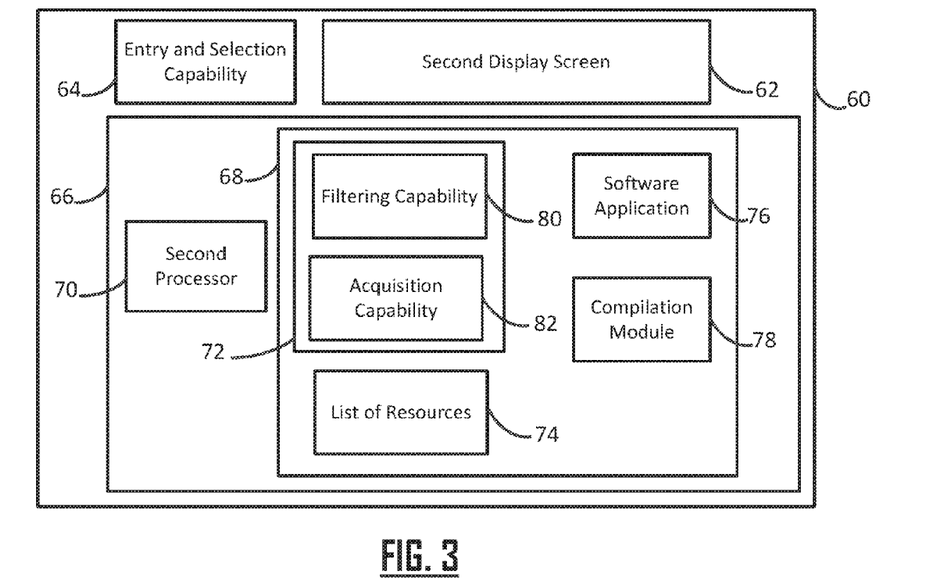
FIG. 3 is a diagrammatic illustration of a device for generating at least one computer file among a computer code and at least one descriptive document of the computer code, in order to produce at least part of the graphic interface.

In FIG. 3, the generation device 60 comprises a second display screen 62, a capability 64 for entering data and a second information processing unit 66 for example formed by a second memory 68 and a second processor 70 associated with the second memory 68.

The entry and selection capability 64 is suitable in particular for entering alphanumeric characters, and for example includes a keyboard and mouse.

The second memory 68 is able to store a software application 72 for creating a formalized description of the graphic interface 50 in the form of software requirements, each software requirement being associated with a graphic object 56 and being created from a list of resources 74.

In the example of FIG. 3, the second memory 68 is configured to store the list of resources 74. In an alternative that is not shown, the list of resources 74 is stored in a memory, not shown, outside the generation device 60.

The second memory 68 is also able to store a software application 76 for generating, from the created formalized description, at least one computer file from among a source code and at least one descriptive document of the source code.

As an optional addition, the second memory 68 is able to store a software application 78 for compiling the generated source code in an executable code, the executable code being able to be executed by the electronic equipment 10 in order to produce at least part of the graphic interface 50. In the described example, the executable code then corresponds to the specific layer 40 shown in FIG. 1.

The creation software application 72, the generation software application 76 and the compiling software application 78 each respectively form a creation module, a generation module and a compilation module.

In an alternative, not shown, the creation module 72, the generation module 76 and the compilation module 78 are made in the form of programmable logic components, such as one or more field-programmable gate array (FPGA), or in the form of dedicated integrated circuits, such as one or more application-specific integrated circuit (ASIC).

The creation module 72 is suitable for creating the formalized description of the graphic interface 50, i.e., for establishing a dynamic definition of the graphic interface 50.

This dynamic definition makes it possible to define how the graphic interface 50, in reaction to a set of stimulations coming from the user, of the kernel 20 and/or the screen 12, triggers processing operations related to the reception of each of those stimulations, then updates the data displayed on the screen 12. Updating the display consists of displaying one or more new pages 54 or refreshing the current page(s) 54, several pages 54 being able to be displayed simultaneously.

The triggering of the processing operations related to the reception of stimulations is done at different levels of the structure of the graphic interface 50. As an example, each format 52 handles the reception of events coming from a viewing equipment, such as the display screen 12, those events for example being the connection or disconnection of the viewing equipment. Each page 54 handles the reception of stimulations, such as events and order returns (previously activated) coming from the kernel 20, the expiration of a time delay (for example, for the periodic refresh of the display), or page events (for example, entering or leaving the page 54). Each graphic object 56 handles the reception of interactions concerning it, such as pressing a button, entering information relative to the graphic object 56.

As an optional addition, the display and refresh of the pages 54 are optimized by using a reference configuration (layout). Introducing the notion of layout makes it possible, after displaying the configuration, to facilitate the refresh of the display by unconditionally redeveloping a restricted subset, known for the configuration, of graphic objects 56 and associated properties. In one consultation mode, the corresponding page 54 then has non-modifiable graphic objects 56. The layout of each page 54 can be modified in a modification mode, for which the graphic objects 56 are editable, their properties being modifiable.

According to one alternative, one manner of refreshing the graphic interface 50 consists of unconditionally redeveloping all of the properties of all of the graphic objects 56, for each event that may modify the graphic interface 50. This complete redevelopment, however, consumes computer resources (central processing unit (CPU), random-access memory (RAM)) and may then saturate the communication toward the screen 12.

According to another alternative, another manner of refreshing the graphic interface 50 is to precisely determine, as a function of the context and as a function of the received event, what the graphic objects 56 are and what properties are to be redeveloped, and redeveloping them accordingly, for each event that may modify the graphic interface 50. This redevelopment is optimized, but the calculation of the targeting of the objects 56 and the properties to be redeveloped also, however, consumes computer resources (CPU).

According to at least one embodiment, the creation module 72 includes a filtering capability 80 suitable for selecting only certain resources from among the list of resources 74, the selection in particular depending on the corresponding graphic object, or as an optional addition, depending on the event to be specified.

Among the software requirements forming the formalized description of the graphic interface 50, at least one software requirement includes a field to be filled in. The creation module 72 includes, as an optional addition, an acquisition capability 82, solely in the form of a string of alphanumeric characters, for data of the field. If applicable, the acquired alphanumeric characters are for example received from the entry capability 64. Each field to be completed is completed using the filtering capability 80 and/or the acquisition capability 82.

In the example of FIG. 3, the creation module 72 is made in the form of a software application as previously described, and the filtering capability 80, the acquisition capability 82, respectively, are then made in the form of respective software functions, included in the software application.

The list of resources 74 comprises types characterized by their class, constraints and associated operators. The class is for example an integer, a floating-point number, a Boolean, a string of characters, a list, a table, or an object. The constraints are for example limits (for integers and floating-point numbers), a size and authorized/prohibited characters (for character strings), possible values (for lists), a size and type of content element (for tables). The operators are for example comparison operators, operation operators, such as mathematical operation operators (multiplication, division, etc.), operators on strings (concatenation, etc.).

The resources are elements included in the libraries 26, 32, 34, the browser 30 and the standardization layers 22, 24 and accessible by the specific layer 40 to perform the processing operations for which is responsible.

Generally, each resource contains information relative to: its display as a requirement piece (text pattern), this being useful for generating documentation and display during the creation of requirements; and its technical characteristics, which is useful for generating code, filtering and creating a requirement.

The list of resources 74 also comprises commands characterized by their complete signature, their type—i.e., synchronous or asynchronous—and by their associated command return if one exists. The signature of a command is the list of input and output parameters of the command, the command for example being a core 20 service, a browser 30 command, a second library 32 command, a message manager 34 command.

The list of resources 74 also comprises command returns characterized by their possible end-of-command statuses and their returned data. The command statuses depend on the commands themselves. In general, this will involve forms of "command successful" (or 'OK') and "command failed" (or 'KO') statuses, or additionally the reason for the rejection related to the core 20 (saturation of a stack, syntax error, use of data unknown by the core, limit error on a unit, etc.).

The list of resources 74 comprises events characterized by their associated reasons and the returned data. The reasons for the events are the counterpart of the command statuses. They depend on the event and indicate why that event was raised. An event is generated by the kernel 20 or by the user via the protocol manager 36.

The list of resources 74 comprises data characterized by the complete signature of the getter, the type of data, the potential presence of an associated validity.

The list of resources 74 comprises the lists of data characterized by the type of data and the available filters.

The list of resources 74 comprises interactive events characterized by their type. An interactive event is defined in the form of a global variable, which may be of any type defined in the resources. Additionally, the types of interactive elements are limited to a subset of types based on the graphic interface 50.

Additionally, in the particular case of data formatting, the list of resources 74 further comprises data formatting categories characterized by their name, the parameters of the formatting (name, type), the results of the formatting (name, type). A result of the formatting is the status of the formatting, such as success, format error, out-of-scope. Another result of the formatting depends on the format itself. As an example, for formatting for data to be displayed, this other formatting result is a string of characters of the same type as expected by the property of the graphic object to be filled in. As an additional example, for formatting of entered numerical data, the other result of the formatting is the data converted into the corresponding unit, potentially rounded and therefore of the type extended by the core command to be filled in.

According to this addition relative to data formatting, the list of resources 74 further comprises data formats characterized by their name, the instantiated formatting category and the values for part or all of the parameters of the instantiated category.

Additionally, in the particular case of messages, the list of resources 74 further comprises message categories characterized by their name and instantiation right and a structure made up of fields (name, modification right, type).

According to this message-related addition, the list of resources 74 further comprises messages characterized by their name, modification right and category. A category refers to a set of messages that are managed in the same way. As an example, messages from the 'user' category have properties specific to them and may be published or erased by the specific layer 40. Messages of the 'system' type are characterized differently and do not have commands for publishing them, since they are published directly by the kernel 20. The modification rights make it possible to restrict the specifier or designer in the design of the messages via the creation module 72. According to the preceding example, the 'system' messages are defined by the kernel 20 and therefore cannot be created, modified, deleted by the specific layer 40. Similarly, some of their properties are not modifiable by the specific layer 40. Conversely, the 'user' messages may be created, deleted and modified by the specific layer 40.

The list of resources 74 is initially a predefined list that characterizes the first and second standardization layers 22 and 24, the libraries 32 and 26, the browser 30 as well as the static definition of the graphic interface 50, defined beforehand. Additionally, the list of resources 74 is configured to be enriched, in particular by the creation module 72, via the addition of particular data lists, messages, data formats and interactive elements.

The generation module 76 is then suitable for generating, from the formalized description created by the creation module 72, at least one computer file among the source code and the descriptive document(s) of the source code.

The generated source code is intended to be compiled, for example via the compilation module 78, in an executable code to produce at least part of the graphic interface 50 of the electronic equipment 10.

Each generated descriptive document contains information relative to the software requirements. Each descriptive document generated by the generation module 76 is for example in accordance with the corresponding requirements of international standard Radio Technical Commission for Aeronautics (RTCA) DO-178C, and is able to contribute to the certification of the corresponding graphic interface 50 according to international standard RTCA DO-178C.

As an example, the generation module 76 is then suitable for generating three descriptive documents, i.e., a specification document including high-level requirements, a design document including low-level requirements, and a requirement traceability document for the specification and/or design documents. The traceability document makes it possible for example to verify that each high-level requirement has at least one corresponding low-level requirement. Additionally or alternatively, the traceability document makes it possible to verify the links between source code elements (constants, procedures, source files, types) and low-level requirements. The traceability document then makes it possible to demonstrate that each high-level requirement has indeed been taken into account during the design, and is an important element for the RTCA DO-178C certification. The compilation module 78 is known in itself, and is suitable for compiling the source code generated by the generation module 76 in executable code, the executable code for example being designed to be executed by the electronic equipment 10, in particular by the first processor 16, for the implementation of the graphic interface 50.

The filtering capability 80 is configured to select only certain resources from among the list of resources 74, such as the list previously described as an example.

The selection done by the filtering capability 80 in particular depends on the graphic object 56 for which the software requirement is created. The selection is for example done based on the properties of the graphic object 56.

Each software requirement is chosen from the group consisting of: an initial display requirement, a display refresh requirement, a requirement of an interaction associated with the graphic object and a requirement for processing an event. In other words, the aforementioned group contains the different possible types of software requirements associated with the graphic objects 56 of the graphic interface.

As an optional addition, the filtering capability 80 is then configured to select, further as a function of the type of the corresponding software requirement, only some resources from the list of resources 74. As an example, in the case of a display refresh requirement, the only available commands for the creation of the software requirement are commands for managing properties of the corresponding graphic object 56. As an additional example, in the case of a requirement of an interaction associated with the graphic object, all of the commands are available for the creation of the software requirement except the management commands for the properties of the corresponding graphic object 56.

As another optional addition, when the software requirement to be created includes a field to be filled in, the filtering capability 80 is configured to select only some resources from the list of resources 74 further based on the type of field to be filled in. As an example, when the software requirement to be created includes a comparison between a first field and a second field, the only data authorized for the second field is data of the same type as that of the first field.

As an optional addition, the filtering capability 80 is further configured to select a syntax of the requirement from among several possible syntaxes, in particular depending on the corresponding graphic object. Syntax refers to a set of conditioned locutions, each conditioned locution including a conditional operator, such as IF, THEN, ELSE-IF, ELSE, FOR, WHILE, followed by a condition and/or an associated action.

According to this optional addition, the filtering 80 is desirably suitable for selecting the syntax of the requirement further as a function of the type of the corresponding software requirement.

When the requirement to be created is an asynchronous requirement with at least one command return, the filtering capability 80 is further suitable for forcing the designer to fill in the expected behavior for each command return. In other words, the filtering capability 80 is then suitable for blocking the generation, or validation, of such a requirement as long as all of the command returns have not been filled in by the designer.

Figure 4:
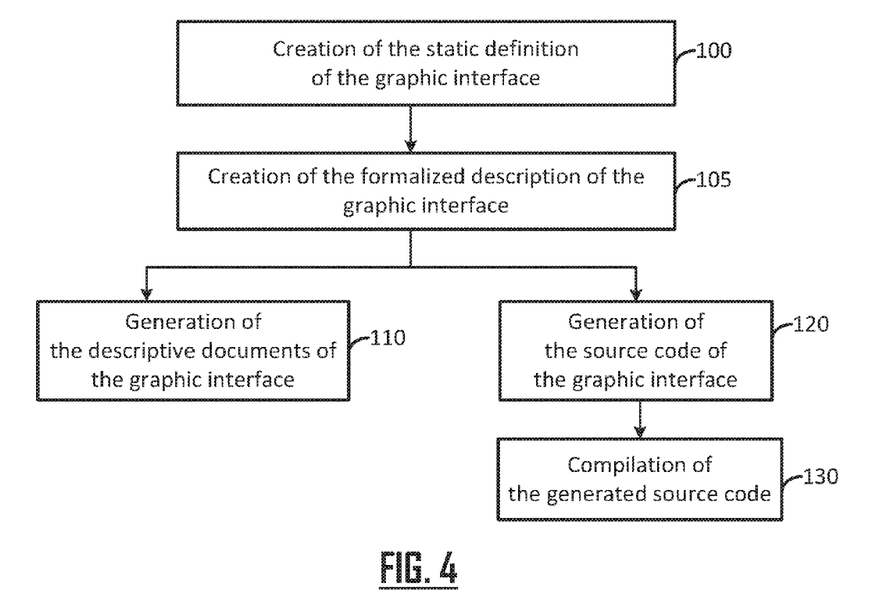
FIG. 4 is a flowchart of a method according to the described technology for generating at least one computer file from among the computer code and the descriptive documents.

The operation of the generation device 60 according to an embodiment will now be explained using FIG. 4, showing a flowchart of the method according to an embodiment for generating at least one computer file from among the computer code and the descriptive document(s) of the computer code.

During an initial step 100, the static definition of the graphic interface 50 is created, the graphic interface 50 including, depending on the created static definition, format(s) 52, page(s) 54 and graphic objects 56, as previously described in light of FIG. 2.

During a subsequent step 105, the formalized description of the graphic interface 50 is created in the form of software requirements via the creation module 72. This creation step 105 will be described in more detail subsequently using FIG. 5.

During the following step 110, descriptive document(s) of the graphic interface 50 are generated automatically via the generation model 76, from the formalized description created during step 105. In the described example, the documents automatically created correspond to the two specification levels required by standard DO-178C.

During the following step 120, the source code of at least part of the graphic interface 50 is generated automatically via the generation module 76, from the formalized description created during step 105. In the described example, the generated source code corresponds to that of the specific layer 40, the other software bricks 22 to 36 of the software component 42 being pre-existing in this example and desirably being shared from one graphic interface 50 to the next.

Lastly, during step 130, the source code generated during the preceding step 120 is compiled into executable code via the compilation module 78, for example to be loaded in the first memory 18 of the electronic equipment 10, then to be executed by the first processor 16, so as to implement the graphic interface 50.

Figure 5:
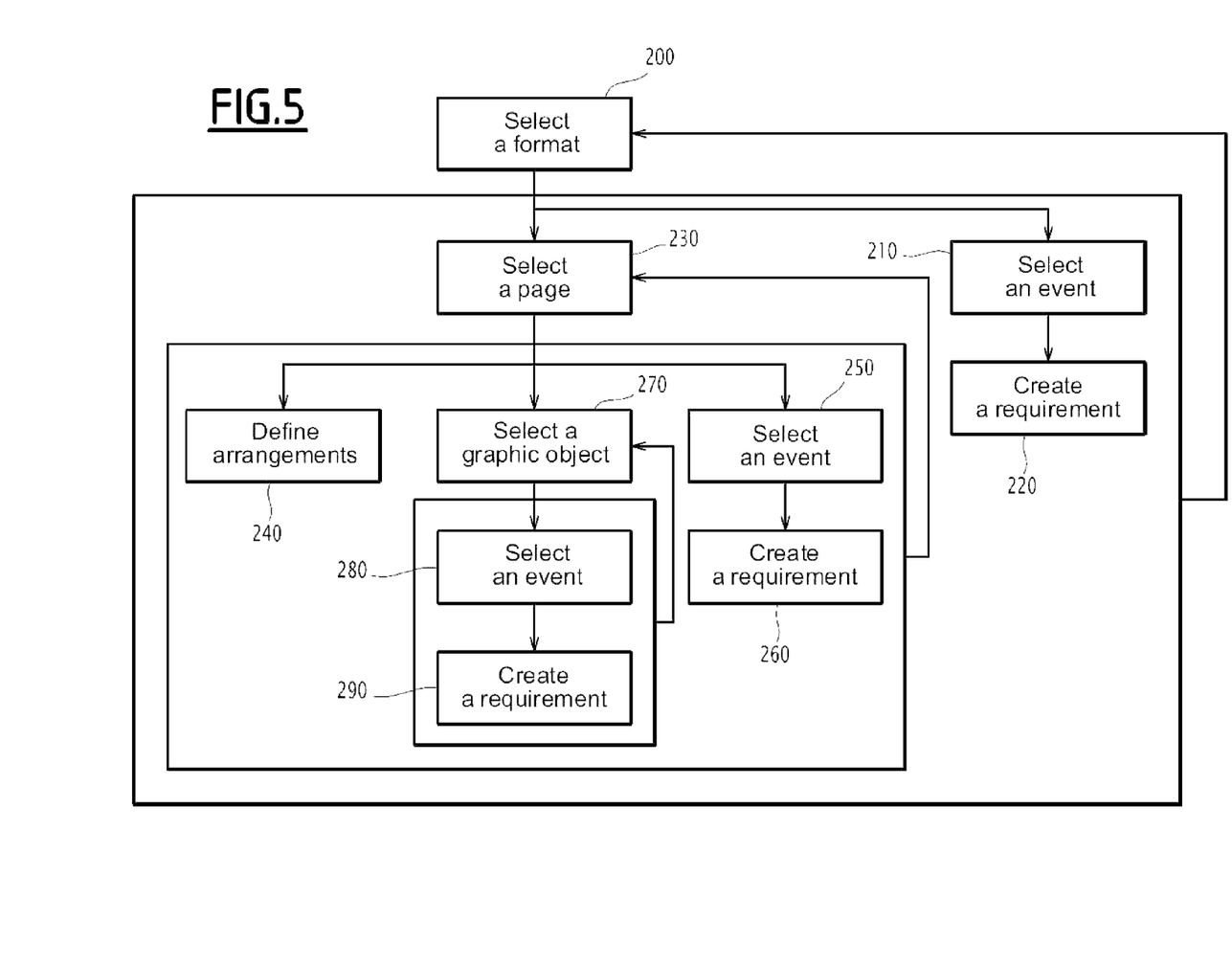
FIG. 5 is a more detailed flowchart of a step of the method of FIG. 4 for creating a formalized description of the graphic interface in the form of software requirements.

The step for creation of the formalized description 105 will now be described in light of FIG. 5.

The creation step 105 comprises a sub-step 200 for selecting a format 52, then for each selected format 52, building software requirements specifying the processing to be done upon reception of each event coming from a viewing equipment, such as the first screen 12, that construction being done via a sub-step 210 for selecting an event, then a sub-step 220 for creating the software requirements for the selected event.

The creation step 105 next comprises, for each selected format 52, a sub-step 230 for selecting a corresponding page 54. For each selected page 54, the creation step 105 comprises a sub-step 240 for defining layouts, also called reference arrangements. For each selected page 54, the creation step 105 comprises the construction of the software requirements specifying the processing operations done upon reception of each event and each command return coming from the kernel 20, and each page event, this construction being done via a sub-step 250 for selecting an event, then a sub-step 260 for creating the software requirements for the selected event.

The creation step 105 next comprises, for each selected page 54, a sub-step 270 for selecting a graphic object 56.

For each selected graphic object 56, the creation step 105 then comprises the construction of the software requirements specifying the processing operations to be done upon receiving each of the interactions associated with the corresponding graphic object 56, as well as the updates of the properties of the graphic object 56 to be done upon reception of the display and page refresh commands for each layout, this construction being done via a sub-step 280 for selecting an event, then a sub-step 290 for creating the software requirements for the selected event.

When the requirement to be created is a requirement including at least one command return, then the filtering capability 80 forces the designer to fill in the expected behavior for each command return. The field of a corresponding command return is, if needed, completed by information indicating a lack of action, such as information called "NOTHING_TO_DO", when there is nothing to do for the associated command return.

During the creation step 105, the creation module 72 allows the user to create the corresponding software requirements via a man-machine interface, not shown, divided into four zones as an example. A first zone makes it possible to select or view the element to be published, i.e., the format 52, the page 54 or the graphic object 56, for the construction of the software requirements. A second zone makes it possible to publish, i.e., to create or modify, the requirement for the element selected among the format 52, the page 54 and the graphic object 56. A third zone shows the available resources among the list of resources 74 for publishing the requirement. In other words, the resources presented in this third zone are the resources previously selected by the filtering capability 80. Lastly, a fourth zone makes it possible to browse the formalized description during creation, while presenting the result of a search, the result of a compilation, the elements related to that selected in the form of hyperlinks.

Thus, with the generation device 60 according to at least one embodiment and the associated generation method, the designer is assisted in the production of the graphic interface 50, while being guided as early as possible, in particular as of the creation of the software requirements, the generation device 60 offering the designer only a limited list of resources for the creation of the software requirements, the limited list having been filtered by the filtering capability 80.

This also makes it possible to ensure as early as possible, i.e., as of the creation of the software requirements, that the constraints associated with the graphic interface of the onboard equipment 10 are indeed verified, and not only once those requirements have been converted into the formal specification(s) as is done with the device of the state of the art.

The list of resources 74 is further configurable and able to be enriched by the generation device 60, in particular by the creation module 72.

The software requirements are directly entered in text form and are considered to be formal specifications.

The graphic interface 50 is then created using a two-step process, i.e., a static definition, followed by a dynamic definition, the static definition of the graphic interface 50 including the structuring of the graphic interface 50 around format notions 52 containing pages 54, those pages 54 in turn being made up of graphic objects 56. The dynamic definition of the graphic interface 50 corresponds to the step 105 for creating the formalized description of the graphic interface 50.

The generating device 60 includes a man-machine interface for entering textual requirements by selection.

The generation device 60 covers and then facilitates the industrial development of software in five phases for the descending part of the V-shaped cycle, i.e., the client specification, the system specification, the formal software specification, the design specification and the generation of the code.

Lastly, the generation device 60 is qualified, guaranteeing that what is defined in the generated document is fully implemented, and that what is implemented is fully specified. The generation device 60 therefore makes it possible to save on the review and test phases related to standard RTCA DO-178C.

The generation device 60 lastly makes it possible to decrease the production cost of the graphic interface 50, to guarantee the compliance of the generated code with generated specification (and vice versa), and to reduce the certification effort for the generated code and the associated documentation.

One can thus see that the generation device 60 and generation method according to at least one embodiment make it possible to facilitate the production of at least part of the graphic interface 50, in particular generation of the source code or the associated documentation, by helping the designer to create software requirements, then by automatically generating the source code and/or the associated documentation from the created software requirements.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An electronic device having a processor and a memory for generating at least one computer file from among a computer code and at least one descriptive document of the computer code, to produce at least part of a graphic interface of an electronic equipment, the device comprising:
    a creation module configured to create a formalized description of the graphic interface in the form of software requirements, each of the software requirements being associated with a graphic object of the graphic interface and being created from a list of resources, and
    a generation module configured to generate, from the created formalized description, at least one computer file among a source code and at least one descriptive document of the source code, the source code being designed to be compiled in an executable code for the production of the at least part of the graphic interface of the electronic equipment, each descriptive document containing information relative to the software requirements,
    wherein the creation module includes a filtering capability configured to select, in particular as a function of the corresponding graphic object, only some resources from among the list of resources,
    wherein each of the software requirements is chosen from the group: an initial display requirement, a display refresh requirement, a requirement of an interaction associated with the graphic object and a requirement for processing an event, and
    wherein the filtering capability is further configured to select a syntax of each of the software requirements as a function of the type of the corresponding software requirement.

2. The device according to claim 1, wherein the device further comprises a compilation module configured to compile the generated source code into an executable code, the executable code being configured to be executed by the electronic equipment to produce the at least one part of the graphic interface.

3. The device according to claim 1, wherein at least one software requirement includes a field to be filled in; and wherein the filtering capability is further configured to select only some resources from among the list of resources further as a function of the field type.

4. The device according to claim 3, wherein the creation module further includes an acquisition capability configured to acquire, only in the form of a chain of alphanumeric characters, data of the field.

5. The device according to claim 1, wherein each of the software requirements is chosen from the group consisting of: an initial display requirement, a display refresh requirement, a requirement of an interaction associated with the graphic object and a requirement for processing an event.

6. The device according to claim 5, wherein the filtering capability is further configured to select only some resources from among the list of resources further as a function of the type of the corresponding software requirement.

7. The device according to claim 1, wherein the filtering capability is further configured to select the syntax of each of the software requirements from among several possible syntaxes, in particular as a function of the corresponding graphic object.

8. The device according to claim 1, wherein each descriptive document generated by the generation module complies with the requirements of standard RTCA DO-178C, each descriptive document being chosen from the group consisting of: a specification document, a design document and a traceability document for traceability of requirements of the specification and/or design documents.

9. The device according to claim 8, wherein each descriptive document is chosen from the group consisting of: a specification document, a design document and a traceability document for traceability of requirements of the specification and/or design documents.

10. A method for generating at least one computer file from among a computer code and a descriptive document of the computer code, in order to produce at least part of a graphic interface of an electronic equipment, the method being implemented by a computer and comprising:
    creating a formalized description of the graphic interface in the form of software requirements, each of the software requirements being associated with a graphic object of the graphic interface and being created from a list of resources,
    generating, from the created formalized description, at least one computer file from among a source code and a descriptive document of the source code, the source code being designed to be compiled into executable code in order to produce at least part of the graphic interface of the electronic equipment, the descriptive document containing information relative to the software requirements,
    wherein the creation step further includes filtering the resources in order to select, in particular as a function of the corresponding graphic object, only some resources from among the list of resources,
    wherein each of the software requirements is chosen from the group: an initial display requirement, a display refresh requirement, a requirement of an interaction associated with the graphic object and a requirement for processing an event, and
    wherein the filtering of the resources further comprises selecting a syntax of each of the software requirements as a function of the type of the corresponding software requirement.

11. The method according to claim 10, wherein the method further comprises, after the generating, compiling the generated source code in an executable code, the executable code being configured to be executed by the electronic equipment in order to produce the at least part of the graphic interface.

12. A non-transitory computer readable medium including a computer program including software instructions which, when implemented by a computer, cause the computer to perform a method, comprising:
    creating a formalized description of the graphic interface in the form of software requirements, each of the software requirements being associated with a graphic object of the graphic interface and being created from a list of resources,
    generating, from the created formalized description, at least one computer file from among a source code and a descriptive document of the source code, the source code being designed to be compiled into executable code in order to produce at least part of the graphic interface of the electronic equipment, the descriptive document containing information relative to the software requirements, wherein the creation step further includes filtering the resources in order to select, in particular as a function of the corresponding graphic object, only some resources from among the list of resources, wherein each of the software requirements is chosen from the group: an initial display requirement, a display refresh requirement, a requirement of an interaction associated with the graphic object and a requirement for processing an event, and wherein the filtering of the resources further comprises selecting a syntax of each of the software requirements as a function of the type of the corresponding software requirement.

\* \* \* \* \*